Nov. 9, 1926.  
W. B. FITTS  
1,606,468  
COTTON CHOPPER  
Filed August 17, 1921    2 Sheets-Sheet 1
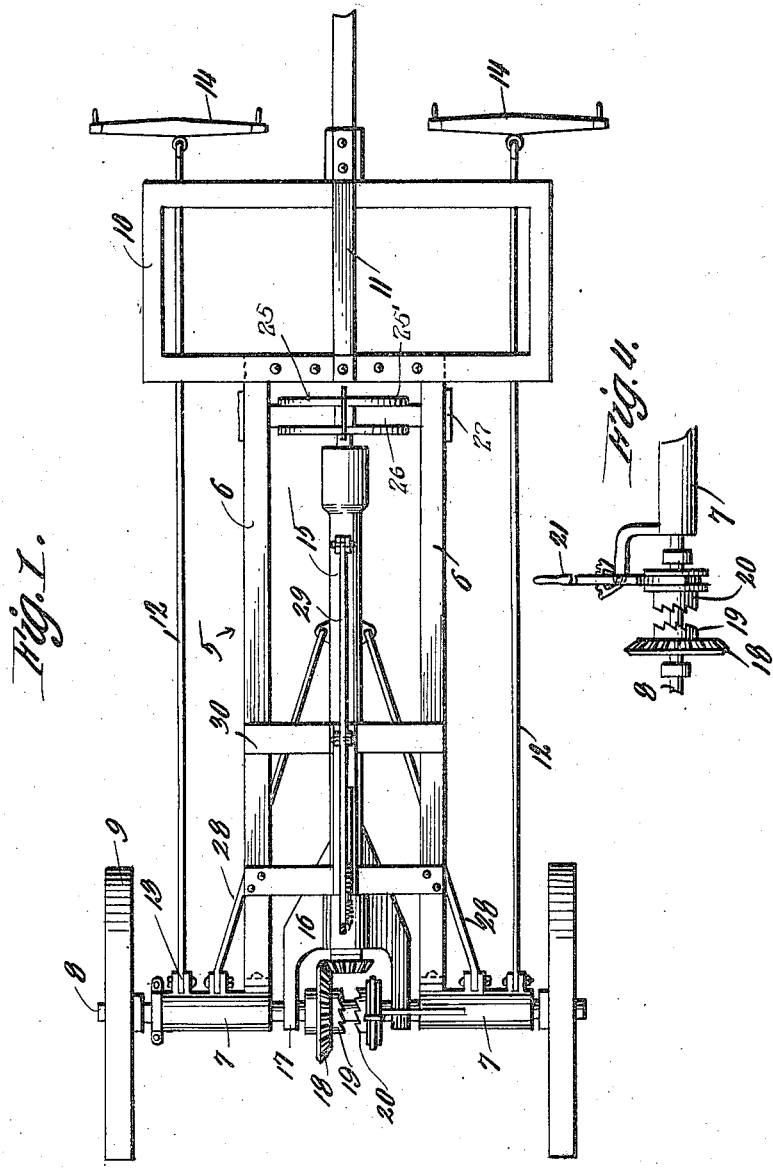
WITNESSES
WILLIAM B. FITTS INVENTOR.
BY
ATTORNEY.

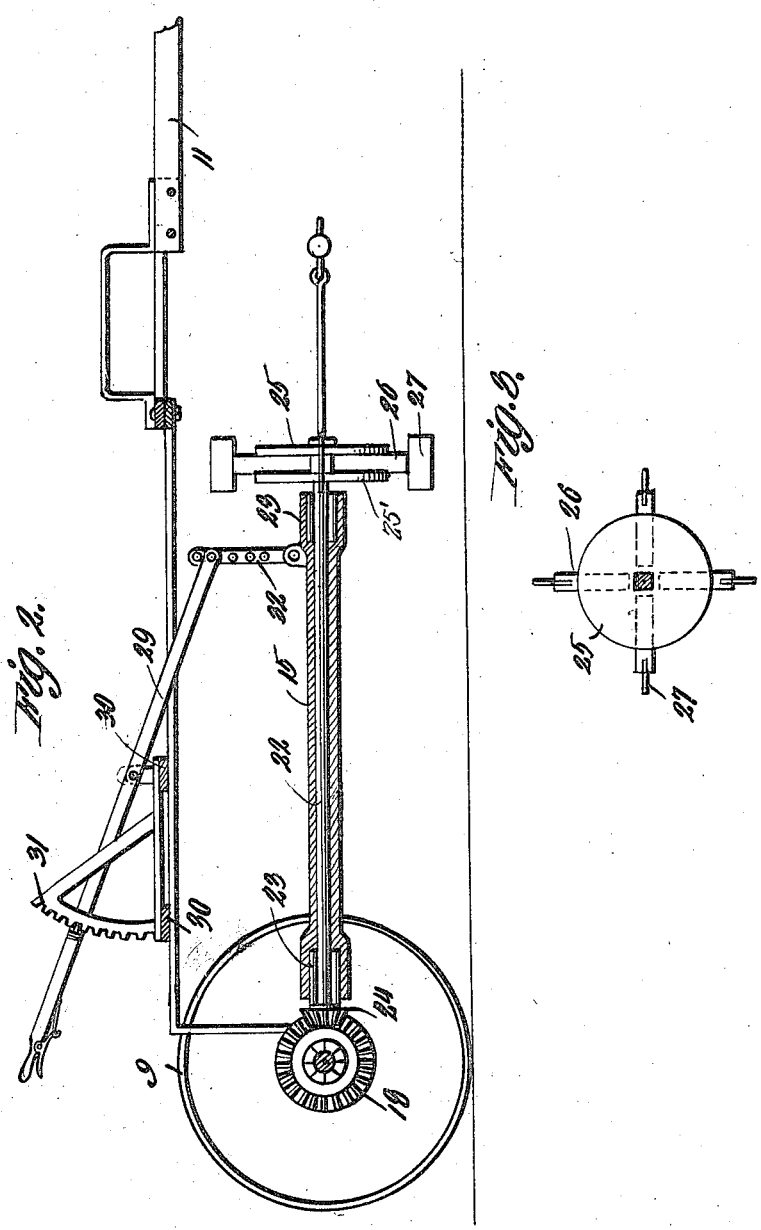

Patented Nov. 9, 1926.

1,606,468

UNITED STATES PATENT OFFICE.

WILLIAM BARRISTER FITTS, OF MARIETTA, OKLAHOMA.

COTTON CHOPPER.

Application filed August 17, 1921. Serial No. 493,069.

This invention relates to new and useful improvements in cotton chopping machines, an important object of the invention being to provide means for imparting rotation to the chopping blades directly from the axle and means whereby rotation of the blades may be stopped without bringing the machine to a standstill.

Another important object of the invention is to provide means whereby the cotton chopping blades may be readily elevated to avoid striking rocks, stumps of trees, etc., which the machine may pass over.

A further object of the invention is to provide means for mounting the frame of the machine directly upon the axle, said frame and means being of a simple and durable nature.

Other objects and advantages of the invention will become apparent during the course of the following description.

In the accompanying drawings forming a part of the application and wherein like numerals are employed to designate like parts throughout the several views, Figure 1 is a top plan of a cotton chopping machine embodying my invention, Figure 2 is a longitudinal section thereof, Figure 3 is a plan of the cotton chopping head, and Figure 4 is an enlarged detail view of the clutch mechanism.

In the drawings wherein for the purpose of illustration, is shown the preferred embodiment of my invention, the numeral 5 designates the frame of the machine in its entirety and which consists of a pair of spaced parallel longitudinally extending bars 6, the rear ends of which are connected to the inner ends of sleeves 7 mounted upon an axle 8. Wheels 9 are of course fastened to opposite ends of the axle for imparting movement thereto when traversing the field. The forward ends of the bars 6 are connected to a rectangular frame work 10 arranged transversely of the longitudinal axis of the machine and the opposite ends of which extend laterally beyond the side bars 6. A tongue 11 is fastened to the rectangular frame 10 when the machine is drawn by horses, but it will of course be obvious that the machine may be pulled by any other suitable power. A draft bar 12 on each side of the frame has its inner end pivotally connected as at 13 to its adjacent sleeve 7, and the forward ends of these draft bars are provided with whipple-trees 14. As clearly seen in Figure 1, these whipple-trees are disposed forwardly of the frame 10 so that as many horses as are desired may be attached to the machine.

A chopper shaft housing 15 extends longitudinally of the machine and is disposed below and between the side bars 6 of the frame. The rear end of this housing is enlarged laterally on both sides as at 16 and is provided with a pair of rearwardly extending spaced apertured arms 17 through which the axle of the machine passes.

A bevel gear 18 is rotatably mounted upon the axle between the arms 17 of the chopper shaft housing and is provided with a clutch member 19 adapted for cooperation with a clutch member 20. This latter clutch member is provided with a pair of spaced annular flanges and is slidably mounted upon a square portion of the axle which is disposed between the arms of the shaft housing. A clutch lever 21 is pivotally mounted upon the bracket carried by one of the sleeves 7 and its lower end is substantially U-shaped to cooperate with the two annular flanges of the clutch member 20 whereby the latter may be moved longitudinally upon the axle and into and out of engagement with its cooperating clutch member 19. The cotton chopper shaft 22 is mounted for rotation within the housing 15, suitable bearings 23 being associated with the housing to reduce the friction of the shaft upon the housing. The rear end of the chopper shaft is extended between the two arms 17 of the housing and is there equipped with a bevel gear 24 which is adapted to mesh with the bevel gear 18. The forward end of the chopper shaft likewise projects beyond its housing 15 and is there provided with a transversely extending chopper head 25. This head includes a pair of spaced disks 25′ between which are secured a plurality of adjustable radiating arms 26, the outer ends of which are each provided with a cutting blade 27. It will be clearly seen that the head 25 and cotton chopping blades are disposed in close proximity to the earth, and in fact the blade arms may be adjusted so that they cut through the row to dig out the whole of certain plants. It will also be clearly seen from Figure 2 that the rear ends of the side bars 6 depend for connection with the sleeves 7 so that the major portions of the bars will be disposed well above the cotton chopping mechanism. Each of brace bars 28 has its inner end pivotally connected with its respective sleeve 7 while its forward end is connected to the chopper shaft housing 15 adjacent the forward end thereof. As clearly seen in Figure 1, these brace bars converge forwardly of the machine so as to preclude every possible lateral movement of the housing 15.

The means I provide for raising and lowering the cotton chopping mechanism including the shaft housing 15, consist of an elongated lever 29 fulcrumed upon one of the cross bars 30 of the frame. The handle end of the lever is equipped with a pawl adapted to cooperate with a vertically disposed rack bar 31 carried by the frame. The lever normally inclines downwardly and forwardly of the machine so that its forward end is disposed below the frame and directly above the forward end of the shaft housing 15. This housing is provided with a link 32 which is pivotally connected thereto and adapted to rise vertically therefrom. This link is provided with a plurality of spaced apertures for adjustable pivotal connection with the forward end of the lever 29.

In use, the wheels of the machine are adapted to straddle a row of vegetation so that the shaft housing 15 is arranged directly above the row and extends longitudinally thereof. The machine is then drawn along the row and when it is desired to chop out certain of the plants, the clutch member 20 is slid into engagement with the clutch member carried by the beveled gear 18 thereby imparting movement to the chopper shaft 22 by means of the small beveled gear 24. Upon rotation of the shaft 22, the cotton chopping head 25 being secured to the forward end of the shaft will likewise be rotated and the cutting blades 27 carried by the heads will be caused to either cut off certain plants or remove them bodily, roots included, depending upon the adjustment of the arms 26 carrying the blades. Should a rock or stump or other obstruction be encountered during the progress of the machine over a row, the lever 30 will be operated to lift the shaft housing 16 and the cotton chopping head 25 so that the blades of the latter will not become damaged by contact with the obstruction. This swinging movement of the housing 15 is permitted in view of its particular connection with the axle as is understood. After the machine has passed the obstruction, the lever 30 may be operated to lower the housing so that the cutting blades 27 will perform their functions.

The foregoing description and accompanying drawings have reference to what might be considered the approved or preferred form of my invention. I desire it to be understood that I may make such changes in the construction, combination and arrangement of parts, material, dimensions, etc., as may prove expedient and fall within the scope of the appended claims.

Having thus described my invention, what I claim as new and desire to secure by Letters Patent is:

1. A cotton chopper comprising a frame including a pair of spaced longitudinally extending parallel side bars, a rectangular frame work arranged transversely and in advance of the side bars and connecting the forward ends thereof, transversely alined sleeves carried by the side bars and projecting outwardly thereof at right angles thereto, an axle rotatably mounted in the sleeves and having an angular portion intermediate its ends, a gear rotatably mounted on the axle, and provided with a stationary clutch section, a drive shaft, a gear carried by the drive shaft and meshing with the first named gear, a clutch member slidably mounted on the angular portion of the axle, and pawl and ratchet means carried by one of said sleeves for moving the movable clutch section into and out of engagement with the stationary clutch section.

2. The combination with a frame including a pair of spaced longitudinally extending parallel side bars, a rectangular frame work arranged transversely and in advance of said side bars and connecting the forward ends thereof, sleeves carried by the side bars and projecting outwardly thereof at right angles thereto, and an axle carried by the sleeves and having an angular portion intermediate its ends, of a gear rotatably mounted on the axle and having a stationary clutch section, a drive shaft, a gear mounted on the drive shaft for engagement with the first named gear, a movable clutch section slidably mounted upon the angular portion of the axle, and pawl and ratchet means carried by one of said sleeves for moving the slidable clutch section into and out of engagement with the stationary clutch section.

In testimony whereof I affix my signature.

WILLIAM BARRISTER FITTS.